United States Patent [19]

Shaffer et al.

[11] 4,446,752
[45] May 8, 1984

[54] EPICYCLOIDAL GEARS AND GEAR TOOTH ARRANGEMENT THEREFOR

[75] Inventors: James E. Shaffer, Longmont; Robert G. Distin, Jr., Louisville, both of Colo.

[73] Assignee: Advanced Energy Concepts '81, Ltd., Boulder, Colo.

[21] Appl. No.: 256,286

[22] Filed: Apr. 23, 1981

[51] Int. Cl.³ .............................................. F16H 55/06
[52] U.S. Cl. ........................................ 74/462; 801/804
[58] Field of Search ................ 74/804, 805, 785, 462, 74/801

[56] References Cited

U.S. PATENT DOCUMENTS

| | | | |
|---|---|---|---|
| 919,914 | 4/1909 | Miller. | |
| 987,430 | 3/1911 | Conant. | |
| 1,192,627 | 7/1916 | Hatlee | 74/804 |
| 1,738,662 | 12/1929 | Morison. | |
| 1,844,471 | 2/1932 | Jonnson. | |
| 2,026,880 | 1/1936 | Fliesberg et al. | 74/805 |
| 2,382,482 | 8/1945 | Henry | 74/805 |
| 2,481,627 | 9/1949 | Sharpe | 74/804 |
| 2,677,288 | 5/1954 | Gnahrich | 74/804 |
| 2,922,294 | 1/1960 | Wildhaber | 74/462 X |
| 2,972,910 | 2/1961 | Menge, Sr. | 74/804 |
| 3,056,315 | 10/1962 | Mros | 74/805 |
| 3,144,791 | 8/1964 | Menge, Sr. | 74/804 |
| 3,192,799 | 7/1965 | Pamplin | 74/805 |
| 3,413,896 | 12/1968 | Wildhaber | 92/57 |
| 3,955,445 | 5/1976 | Osterwalder | 74/805 |
| 4,023,441 | 5/1977 | Osterwalder | 74/805 |
| 4,155,276 | 5/1979 | Fengler | 74/804 |
| 4,270,401 | 6/1981 | Davidson | 74/462 |

Primary Examiner—Allan D. Herrmann
Assistant Examiner—Frank McKenzie
Attorney, Agent, or Firm—Sughrue, Mion, Zinn, Macpeak & Seas

[57] ABSTRACT

The invention relates to gears and gear trains, and more particularly to epicyclic gear trains of low cost and improved efficiency, and to gear teeth for use therewith. A novel driving means in the form of an eccentric crank/counterweight is provided, and the structural relationships between the several gears are such that the need for conventional bearings is completely obviated. The gear train is of modular construction, being split diametrically into matched halves. Thus, the gear ratio of the overall gear box may be quickly and easily varied by merely replacing one of the matched halves with another. The novel tooth construction for use with such epicyclic gearing employs a large pressure angle which allows circular arc profile involute teeth to be utilized.

3 Claims, 5 Drawing Figures

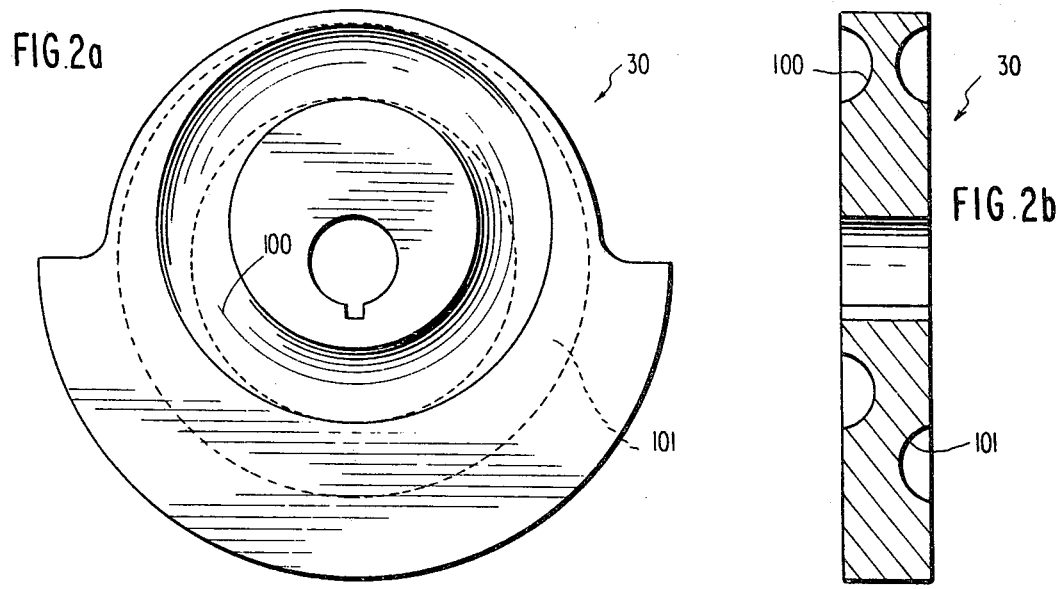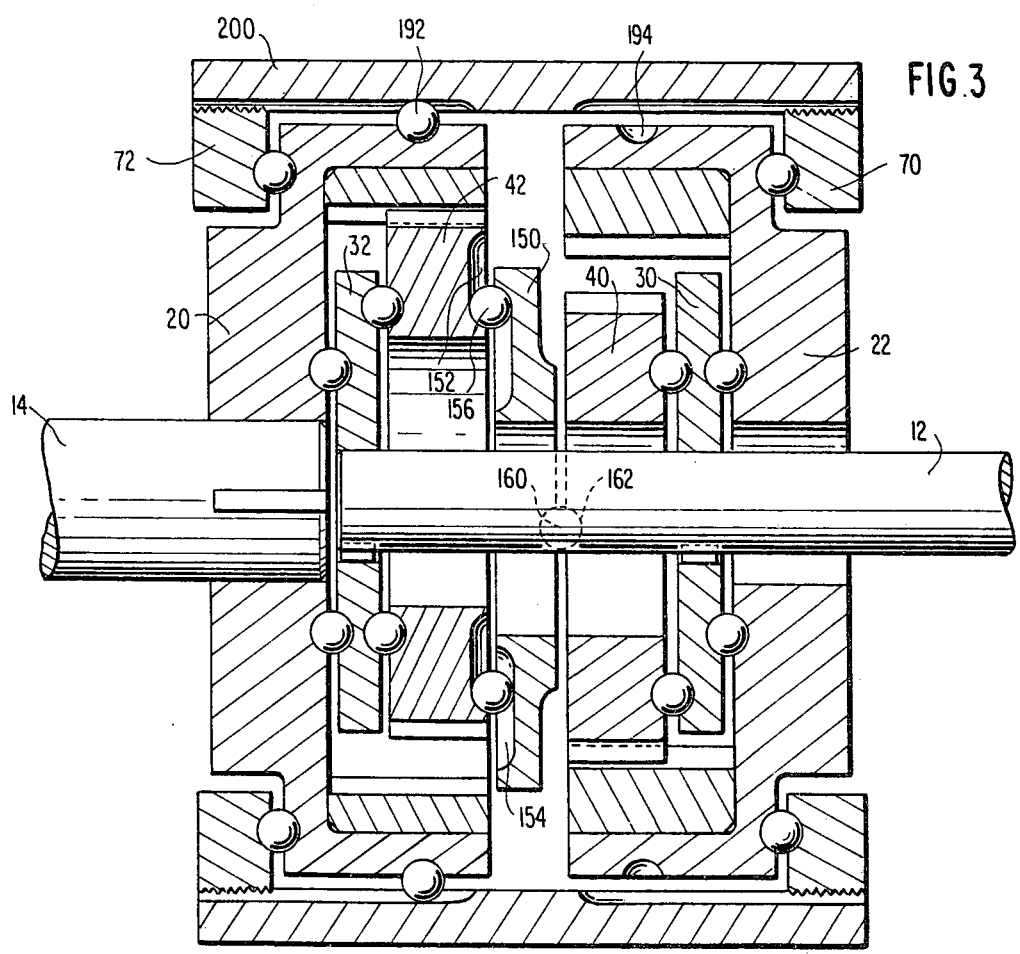

EPICYCLOIDAL GEARS AND GEAR TOOTH ARRANGEMENT THEREFOR

BACKGROUND OF THE INVENTION

A variety of types of speed changing mechanisms have long been known in the art. Among these types are those generally described as epicyclic, wherein at least one gear is made to undergo orbital as well as rotational motion. It has long been known that such types of gearing are very effective as speed reducers, as a large ratio speed reduction may be obtained by means of a relatively small gear train arrangement.

In order to obtain the maximum speed reduction possible, prior art epicyclic gearing systems have employed meshing gears wherein the number of teeth on a "ring" gear and that of the "orbiting" gear differed by one. While such a system was quite effective for torque transmission, as a number of teeth were simultaneously engaged with one another, this type of gearing was very expensive to manufacture, because the machining tolerances of the gears and of the individual teeth were quite critical.

Furthermore, as a drive for such epicyclic gearing, a shaft with an eccentric lobe resembling a cam was normally provided, this part normally being machined out of a single piece of stock. Such a driving means, of course, was quite expensive to produce, and even more so if the shaft was integrally provided with counterweights. Moreover, all known prior epicyclic gear trains require a number of conventional bearings located at the input and output of the gear box, as well as at intermediate locations within the gear train itself. Of course, the inclusion of such bearings greatly added to the cost of the overall device.

SUMMARY OF THE INVENTION

The epicyclic gear train of the instant invention remedies the several deficiencies of prior art epicyclic gear trains noted above. According to the present invention, an epicyclic gear train is provided in which a forward, neutral and reverse drive may be selectively obtained. The several components of the gear train are arranged in an axially stacked relationship, resulting in a compact, yet rugged assembly. The gear train is provided with a novel input means in the form of an offset eccentric crank, which also combines the functions of input and output bearings, and a counterweight for offsetting the eccentric motion. The eccentrics, as well as all of the other gear box components, are directly supported for rotation upon others of the components, by cutting races for bearing members directly into the surfaces of the eccentrics and the gears. In this manner, conventional bearings may be dispensed with, and the entire assembly may easily be axially preloaded to any desired degree.

The gear train is provided as a modular system, in which a number of different "halves" of the gear train are provided, these "halves" being selectively matchable with one another in order to provide a wide variety and range of gear ratios from a limited number of component halves. Depending upon which of the halves is braked, the gear train can run in forward or reverse or be equipped with a neutral.

The gears of the instant invention are provided with a novel tooth design, which uses a quite high pressure angle of 30 degrees, plus or minus 7 degrees, depending upon the difference in the numbers of teeth provided on the meshing gears. In one disclosed embodiment, there is a difference of four teeth between the outer cup-shaped ring gears and the inner, idler or pinion gears, and a high pressure angle of 30 degrees is used. The teeth are of generally involute shape, but have circular arc flanks owing in part to the use of the high pressure angle.

The main object of this invention is to provide an epicyclic gear train of compact and rugged construction which is capable of operating in forward, neutral and reverse modes and which is capable of a high reduction ratio.

Another object of this invention is to provide such an epicyclic gear train with a novel driving means which also performs the functions of a counterweight, as well as that of thrust and radial bearing members.

It is another object of this invention to provide a gear train assembly wherein the gears are arranged in a compact axially stacked relationship, wherein the gears are bearingly supported for orbital and rotational movement by means of rollers, whose races are cut directly into the gears themselves.

It is a still further object of this invention to provide a gear box of modular design, wherein the mixing and matching of a limited number of mating gear box halves results in a large variety of usable forward and reverse ratios.

The above, together with other objects and advantages which will become subsequently apparent, reside in the invention as more fully hereinafter described and claimed, reference being had to the accompanying drawings forming a part hereof, wherein like numerals refer to like parts throughout.

BRIEF DESCRIPTION OF THE DRAWINGS

FIGS. 2 and 2a are front and side sectional views, respectively, of the eccentric/counterweight device used in the gear box of FIG. 1;

FIG. 3 illustrates a second embodiment according to the present invention wherein counterbalancing is effected by the gears themselves.

DETAILED DESCRIPTION OF THE INVENTION

Epicyclic Gear Train

Figure 1:
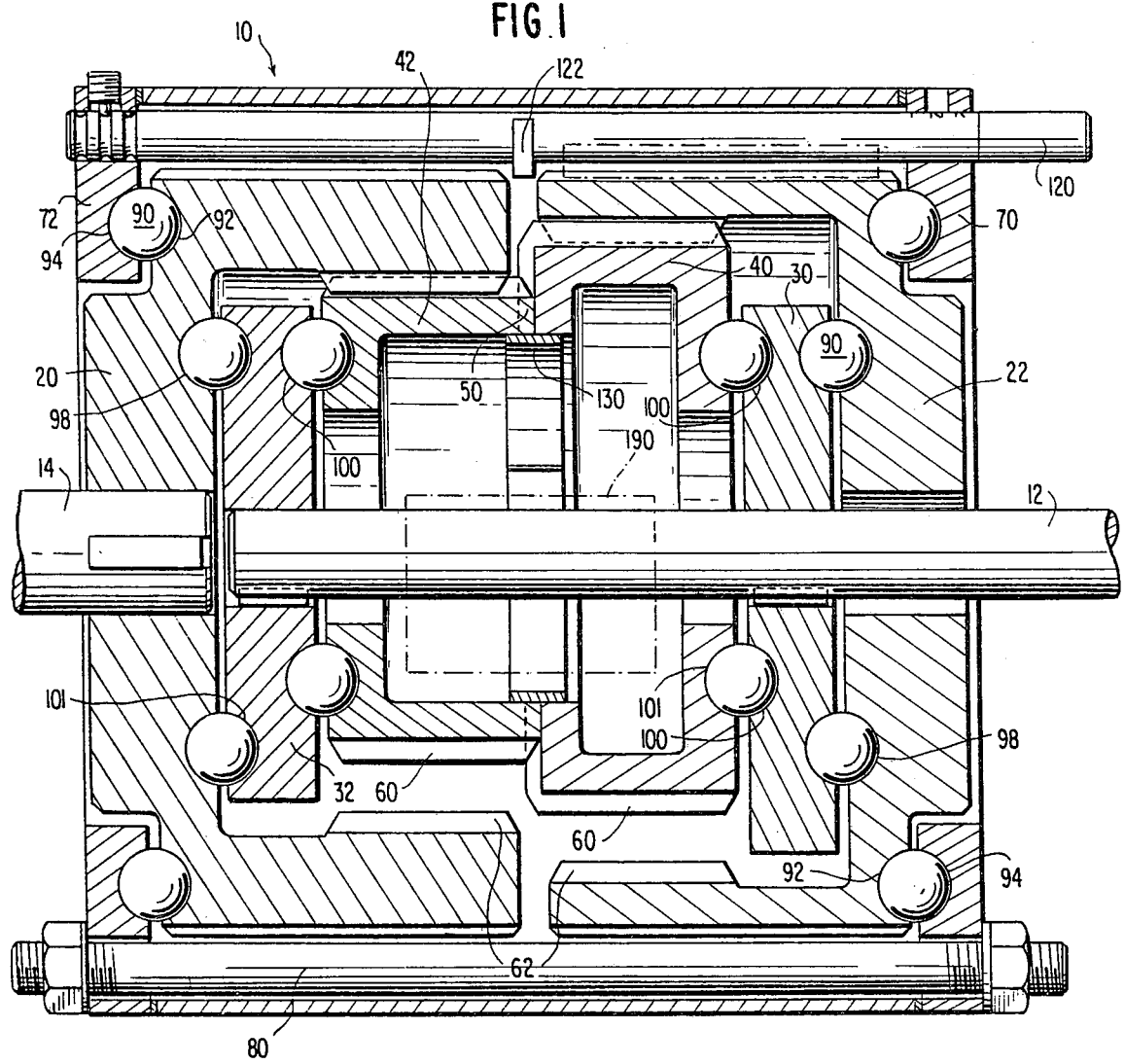
FIG. 1 is a side sectional view illustrating a preferred embodiment of the epicyclic gear train of the present invention.

Referring now more specifically to the drawings, and in particular to FIG. 1, the numeral 10 generally designates the gear box of the present invention, the gear box having an input shaft 12 and an output shaft 14 on the right and left hand sides of the gear box, respectively. The output is taken off a first cup-shaped gear 20, which is operatively but removeably engaged with the output shaft by means of splines, keys or the like. For a reason to be explained later, the second or right hand cup-shaped gear 22 is provided with internal splines or keyways identical to those of the gear 20 which are not directly operatively engaged with input shaft 12.

The input shaft 12 is operatively connected to a pair of eccentric/counterweight devices 30, 32, which are identical mirror-image replicas of each other. The shape of the eccentric/counterweight device can more clearly be seen in FIG. 2.

Each of the eccentric elements 30, 32 are operatively associated with a respective orbiting/rotating gear 40, 42, which will hereinafter merely be referred to as pinion gears. The two pinions 40, 42 are detachably connected to one another for uniform orbiting and rotary motion, by means of a plurality of dogs 50 which may be four in number, two of which are seen in FIG. 1.

Each of the pinions 40, 42 is disposed within a respective cup-shaped gear 20, 22, and is in meshing engagement therewith by means of rings of generally involute teeth 60. The teeth 60 on the pinions 40, 42 are identical, as regards their shape and formation. As is well known in the art, the teeth 62 provided on the cup gears are complementary to the teeth 60 on the pinion gears.

All of the above-noted elements are bearingly supported within the gear box proper between a pair of opposed plates 70, 72 having large circular apertures therein. The two plates are suitably connected by a number of tie rods 80, which are used to preload the assembly in the axial direction to a pressure in the neighborhood of 600 pounds. A tubular casing may surround the assembly between the plates 70, 72 if desired.

As is apparent from FIG. 1, the gear box lacks conventional radial and/or thrust bearings, the cup-shaped gears 20, 22 being bearingly supported upon the plates 70, 72 by means of a circular ring of steel balls 90. In a similar manner, each of the other elements are bearingly supported directly or indirectly upon the cup-shaped gears 20, 22. Bearing races for the rings of balls are cut into the respective members in a suitable manner, such that a small clearance is maintained between adjacent parts when the balls are in place therebetween. The bearing members so formed by this procedure, act, due to their configuration, as both radial and axial thrust bearings. As previously noted, the entire assembly is axially preloaded to a large extent, which assists in holding the gear box together.

The bearing races 92 cut in the peripheral surface of the cup-shaped gears 20, 22 are concentric with the axes of rotation of these gears, such that the ring of balls 90 support the cup-shaped gears for rotation about their axes in a normal fashion. It should be noted that the axes of rotation of the cup-shaped gears 20, 22 are coincident with one another.

The axes of rotation of the eccentric/counterweight devices 30, 32 are also coincident with one another, and with those of the cup-shaped gears as well. In addition, the races 98 cut into the cup-shaped gears for supporting the eccentrics 30, 32 have central axes coincident with the axes of rotation of the eccentrics. However, both of the pinions 40, 42 are eccentrically mounted with respect to the common axis of rotation of the eccentrics 30, 32 by a predetermined amount. Thus, the races 100 cut in the inner surfaces of the eccentrics for supporting the pinions have axes offset from the common axis of rotation of the eccentrics, but coincident with the axes of rotation of the pinions themselves.

Referring to FIG. 2, the raceway 100 is illustrated in solid lines, while the raceway 101 on the other side of the eccentric is illustrated in dotted outline. As can easily be seen, the raceway 101 is concentric with the rotational axis of the eccentric/counterweight, while the raceway 100 has a central axis offset from the central axis by a predetermined amount. This eccentricity will cause the pinion gears 40, 42 to orbit about the central axis of the gear box when the input shaft 12 and the eccentrics 30, 32 are rotated. During this orbital movement, the pinions 40, 42 will normally also be rotating about their own axes, due to the engagement of these gears with the cup-shaped gears 20, 22. Thus, if the cup-shaped gear 22, for example, is in a braked or locked condition, the pinion 40 will be made to "walk around" the interior of the cup-shaped gear, rotating about its own axis while orbiting about the axis of the cup-shaped gear.

Operation

The gear train of FIG. 1 operates as follows:

Rotary motion is imparted to input shaft 12 by any known means, causing the eccentric/counterweight devices 30, 32 to likewise rotate. It should be noted that the input shaft 12 does not engage the pinions 40, 42 or the cup-shaped gear 22. As the eccentrics 30, 32 are made to rotate about their own axes, pinions 40, 42 are made to orbit about the central axis of rotation. In other words, the eccentrics 30, 32 actually drive the pinions 40, 42. As the eccentrics are arranged in mirror image fashion, equal orbital rotary force is imparted to the respective pinions 40, 42 in the same direction, the orbital motion proceeding in the same direction (e.g. clockwise or counterclockwise) as that of the input shaft 12. On the other hand, the rotary movement of the pinions about their own axes proceeds in a direction opposite to that of the input, as the pinions "walk around" the interior of the cup-shaped gears 20, 22.

Assuming neither of the cup-shaped gears is braked, and thus can freely rotate, the entire gear box will be in a freewheeling condition, or neutral, so that no output will be taken through shaft 14. The gearbox is provided with a shifting mechanism 120 as seen in FIG. 1, which includes a rod member equipped with a brake member 122. The rod is selectively shiftable between three positions for Forward, Neutral and Reverse, respectively. In the Forward position, the brake member 122 will lock the cup-shaped gear 22 against rotation, while when in the Reverse position, the member 122 will lock the cup-shaped gear 20 against rotation. In the instance shown in FIG. 1, the shifter is in the Neutral position such that the gear train is free wheeling.

When the gear 22 is braked, the pinion 40 will "walk around" the interior of this gear, as noted previously, and the gear 42 will be made to rotate at the same speed as the gear 40, owing to the interconnection between these two gears. The rotary motion of the pinions 40, 42 will be counter to that of the input rotation, as mentioned previously. The ring 130 located between the pinions 40, 42 does not normally assist in the innerconnection function, but instead helps in maintaining the concentricity of these two gears.

Thus, the pinion 42 rotates about its own axis at a speed determined by the pinion 40, while it orbits about the central axis at a rate determined by the rotary speed of the input shaft 12. Due to the compound motion of the gear 42, the cup-shaped gear 20 will rotate in the same direction as the input shaft 12, but at a greatly reduced speed, which may be in the range of 40:1. The output will always be in the same direction as the input when the gear 22 is braked, as long as the radius of the pinion 42 is smaller than the radius of the pinion 40. If, on the other hand, the radius of the gear 42 is larger than that of the gear 40, the output gear 20 will rotate in the reverse direction, again at a greatly reduced speed.

As mentioned previously, the gear box 10 of the present invention is of modular construction, allowing the construction of a number of compatible gear box "halves". One "half" consists of a pinion gear and a mating cup-shaped gear, along with an eccentric weighted so as to cancel the imbalance forces of the pinion gear used. A great number of ratios may be obtained by, for example, removing the left-hand "half" of the gear box of FIG. 1 and replacing it with a similar half wherein the gears have a different pitch diameter. For example, it can easily be illustrated that for six different matable "halves" a total of 30 different speed ratios may be obtained, 15 forward ratios and 15 reverse ratios.

When the brake member 122 is shifted to the reverse position, i.e., to the left from the position illustrated in FIG. 1, the gear 20 will now be braked and thus there will be no output through the output shaft 14. In this instance, however, the gear 22 will be free to rotate and will, in fact, rotate in a direction opposite to the input rotational direction, and at a reduced speed. Thus, the output may, in this instance, be taken off of the gear 22 by any conventional means, e.g. a sleeve.

However, it is not necessary to equip the gear box 10 with such a second output means. Instead, the input and output shafts 12, 14 may be axially removed from the gear box, after which the entire gear box may be rotated laterally through 180 degrees. The input shaft may then be reinserted into the gear box, the shaft 12 entering through the aperture in the gear 20, and engaging the eccentrics 32, 30 in that order. The output shaft 14 will now be connected to the gear 22, whose aperture is sized so as to fit the output shaft 14, as mentioned previously. With the gear train in this position, if the input shaft 12 is driven, for example, clockwise, with the gear 20 braked (the reverse position of the shifter 120), the output gear 22 will rotate counterclockwise at a reduced speed. The reverse drive is the end result of the pinion 40 meshing with the unbraked gear 22 being larger in diameter than the pinion 42 of the braked gear 20, as was explained previously.

Turning now to FIG. 3, a second embodiment according to the present invention is disclosed, this embodiment being highly similar to the embodiment of FIG. 1 in most respects. However, in this gear box, the eccentric devices 30, 32 are not used as counterweights, but are instead provided merely as plates in which the required bearing races are cut. Instead, the gears 40, 42 are disposed so as to be 180 degrees "out of phase" with respect to one another, so that one gear cancels out the imbalance force produced by the orbital motion of the other. However, the gears 40, 42 are still coupled for conjoint oribital and rotary motion by means of a coupling device 150.

As shown in FIG. 3, the coupling device 150 takes the more or less conventional form of the well-known Oldham coupling, which is commonly used in the coupling art for rotatably connecting radially offset rotatable members. The gear 42 is provided with a pair of vertical slots 152 cut therein, while the coupling member 150 is provided with complementary slots 154. Two ball members 156 couple the gear 42 to the coupling member 150 for rotation therewith, while allowing a degree of radial "play" between these members. In a like manner, the coupling 150 is provided with horizontal slots 160 which oppose similar slots 162 provided in the gear 40. Again, ball members couple the two elements together for rotation, with a degree of radial play.

In this manner, the gears 40, 42 are coupled together for synchronous or conjoint movement in a manner which is totally equivalent to the direct connection illustrated in FIG. 1. However, as the gears 40, 42 of the FIG. 3 embodiment serve the counterbalancing function previously ascribed to the eccentrics 30, 32, these latter elements may now be provided simply as plates.

Other methods of balancing, of course, may also be used in place of the eccentrics 30, 32. For example, as illustrated in FIG. 1, the eccentrics 30, 32 may be provided merely in the form of plates, while the counterbalancing function is performed by a conventional shaft-mounted counterweight, as seen in phantom at 190. However, applicants have found it to be of great advantage to combine functions as much as possible, to save space and add to the versatility of the device. Therefore, it is preferred that the eccentrics 30, 32 perform the counterbalancing function, in addition to their bearing and crank functions, as was the case in the FIG. 1 embodiment.

Referring again briefly to FIG. 3, this drawing also illustrates an alternative fashion of braking the selected cup-shaped gear 20, 22. In particular, in FIG. 3, the cup gear 20 is braked by means of a ball member 192 seated therein, which coacts with a horizontal groove provided on the sleeve 200. In order to shift from Forward to Reverse or vice versa, the balls 192 are removed from their seats in one gear, and are placed in like seats, such as at 194, in the other gear.

Tooth Design

As is well known, the standard tooth shape used in conventional gearing is the involute contour, which is designed so as to achieve constant velocity output. However, it is well known that when such teeth are used in connection with epicyclic gearing, problems develop when the difference in the numbers of teeth ("delta") is about 10 or less. The problems are due to the fact that the teeth start interferring at this point. In conventional epicyclic gearing, therefore, a variety of different tooth designs have been developed, including more or less triangularly-shaped teeth, somewhat sinusoidally-shaped teeth, etc. In addition, several alternative torque transmission means such as pins have been used in place of teeth.

Figure 4:
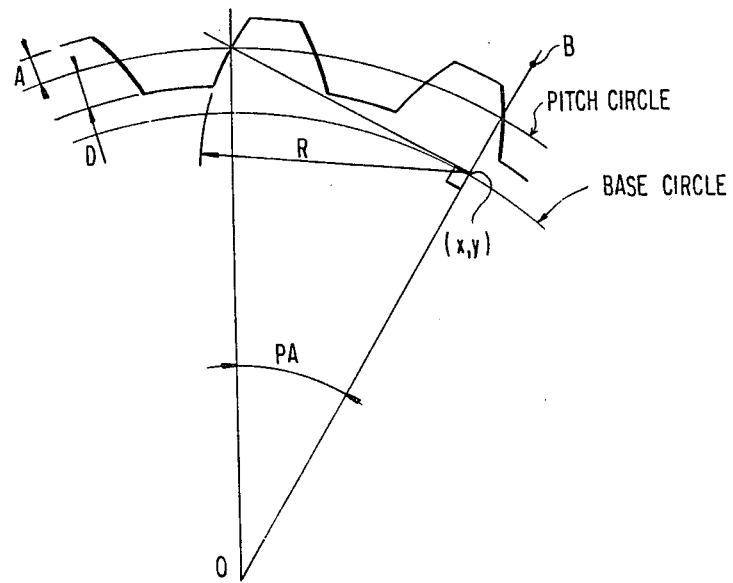
FIG. 4 is an enlarged view of the gear teeth used in the gear trains of FIGS. 1 and 3.

Illustrated in FIG. 4 is a portion of the gear teeth provided on the outer circumference of the pinion gears, it being understood that the tooth arrangement on the cup-shaped gears is complementary.

The present inventors have discovered that maximum efficiency is achieved when the difference in the numbers of teeth on the interengaging gears, e.g., the "delta", is between 2 and 8. In the specific embodiment disclosed herein, the "delta" is 4, there being four more teeth on the cup-shaped gears than on the inner gears or pinions.

In many epicyclic gear trains of the prior art, the meshing gears were designed so as to have a delta of 1, in order to obtain the highest speed change ratio possible. However, the designing and machining of such gears is quite critical, due to the extremely close tolerances which must be maintained in order for such gears to operate properly. Applicants have found that by increasing the value of delta somewhat, the efficiency is greatly improved, and the material and manufacturing costs are greatly decreased. In the present system, the gear teeth have a pressure angle PA of 30 degrees plus or minus 7 degrees, depending upon the specific delta. Applicants have found that a pressure angle PA of 30 degrees gives quite good results with deltas of 2 and 4. It has also been found that the pressure angle should be reduced somewhat as delta is allowed to increase, or as the tooth is shortened in height.

The tooth design of the present invention can generally be described as a circular arc approximation of a conventional involute profile. The tooth height is approximately one-half that of a normal stub tooth, and even less than one-half the height of a normal spur tooth. The teeth of the present invention have been designed for maximum efficiency, minimum tooth face velocities, and low tooth face surface stresses for a given load. The teeth provide a slight rocking motion on contact, with an accompanying very slight slipping motion over 20 degrees to 25 degrees of rotation, and are not in contact with the mating or meshing teeth during the remaining portion of arc. Odd numbers of teeth are used on the meshing gears, so as to eliminate resonant frequency problems in a known manner.

As seen in FIG. 4, the pressure angle is selected to be equal to 30 degrees. Because of this rather high pressure angle, and due to the rather small tooth height, the profile of the teeth can be made as circular arcs, having a radius equal to the distance between the intersection of the base circle and the line $\overline{OB}$ and the surface of the tooth face. The base circle diameter, of course is equal to the cosine of the pressure angle, times the pitch circle diameter. In terms of specific relationships among the gear parameters, the radius distance can be written as follows:

$$R = PD/2\ \text{SIN(PA)} \tag{1}$$

where:
R is the radius of the tooth face;
PD is the diameter of the pitch circle measured in inches; and,
PA is the pressure angle.

The addendum and dedendum are defined by the following:

$$A = 0.4/DP; \tag{2}$$

$$D = 0.5/DP \tag{3}$$

where:
A and D are the tooth addendum and dedendum, respectively, and DP is the diametral pitch.

Assuming a diametral pitch of 8 and a pitch circle diameter of 4 inches, for a delta of 4, the optimal pressure angle can be confirmed as being 30 degrees plus or minus 7 degrees. For the values given above, the addendum and dedendum would be 0.05 inches and 0.062 inches, respectively, it being understood that the addendum and dedendum are reversed for the concave shaped internal teeth provided on the cup-shaped gears 20, 22.

From the above considerations, and in particular from equation (1), it is seen that the point coordinates (X,Y) of the gear profile radius center may be defined simply as:

$$X = PD/2\ \text{COS(PA)\ SIN(PA)};\ \text{and} \tag{4}$$

$$Y = PD/2\ \text{COS}^2\text{(PA)}. \tag{5}$$

From the values given above, the actual numerical values of X and Y can easily be obtained. The simplicity of the tooth profile according to the present invention, e.g. its simple circular arc shape, can lead to substantial cost savings as compared to conventional gear teeth used with epicyclic gear trains.

The foregoing is to be considered as illustrative only of the several principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as defined by the claims.

What is claimed is:
1. An epicyclic gear train, comprising:
input and output means;
first and second orbiting gears;
first and second eccentric members coupled to said input for orbitally driving said orbiting gears;
first and second outer gears meshingly engaged with said first and second orbiting gears, respectively;
means for selectively braking either of said outer gears;
means for counterbalancing imbalance forces caused by said orbiting gears; and bearing means for supporting said orbiting gears for orbiting and rotating motion, said bearing means including first races formed in confronting axial surfaces of said first orbiting gear and said first eccentric member as well as in confronting axial surfaces of said second orbiting gear and said second eccentric member, respectively, and rollers guided in said first races; and
wherein said first orbiting gear and said first outer gear mesh with teeth having circular arc profiles and having a pressure angle of 30°±7° in dependence upon the number of teeth difference between said first orbiting gear and said first outer gear, the number of teeth on said first orbiting gear being less than that on said first outer gear by a number of between two and eight.

2. The epicyclic gear train as claimed in claim 1 wherein said bearing means further includes second races formed in confronting axial surfaces of said first outer gear and said first eccentric gear member as well as in confronting axial surfaces of said second outer gear and said second eccentric member, respectively, and second rollers guided in said second races.

3. The epicyclic gear train as claimed in claim 2, further comprising first and second supporting members for supporting said first and second outer gears, said bearing means further including third races formed in confronting axial surfaces of said first outer gear and said first supporting member and in confronting axial surfaces of second outer gear and said second supporting member, and third rollers disposed in said third races.

* * * * *